United States Patent
Kortum et al.

(10) Patent No.: US 9,495,072 B2
(45) Date of Patent: Nov. 15, 2016

(54) SYSTEM AND METHOD FOR SHARING CONTENT WITH A REMOTE DEVICE

(75) Inventors: Philip T. Kortum, Houston, TX (US);
Marc A. Sullivan, Austin, TX (US);
James L. Cansler, Jr., Pflugerville, TX (US); Alyssa Lenorah Noll Williams, Elmhurst, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1142 days.

(21) Appl. No.: 11/346,616

(22) Filed: Feb. 2, 2006

(65) Prior Publication Data

US 2007/0180382 A1  Aug. 2, 2007

(51) Int. Cl.
*H04N 21/475* (2011.01)
*G06F 3/0482* (2013.01)
*H04N 7/173* (2011.01)
*H04N 21/422* (2011.01)
*H04N 21/434* (2011.01)
*H04N 21/442* (2011.01)
*H04N 21/63* (2011.01)
*H04N 21/658* (2011.01)

(52) U.S. Cl.
CPC ........ *G06F 3/0482* (2013.01); *H04N 7/17309* (2013.01); *H04N 21/42204* (2013.01); *H04N 21/4345* (2013.01); *H04N 21/44222* (2013.01); *H04N 21/4751* (2013.01); *H04N 21/632* (2013.01); *H04N 21/6582* (2013.01)

(58) Field of Classification Search
CPC .......... G06F 3/0482; H04N 21/42204; H04N 21/4345; H04N 21/44222; H04N 21/4751; H04N 21/632; H04N 21/6582; H04N 7/17309
USPC ........................................................ 709/204
See application file for complete search history.

(56) References Cited

U.S. PATENT DOCUMENTS

| | | | |
|---|---|---|---|
| 5,923,734 | A | 7/1999 | Taskett |
| 6,272,261 | B1 | 8/2001 | Matsuoka |
| 6,324,521 | B1 | 11/2001 | Shiota et al. |
| 6,578,072 | B2 | 6/2003 | Watanabe et al. |
| 6,762,860 | B1 | 7/2004 | Watanabe et al. |

(Continued)

OTHER PUBLICATIONS

J Walker, Share It!—A Rights-Managed Network of Peer-to-Peer Set-Top-Boxes, Sep. 22, 2003, http://www.hitech-projects.com/euprojects/share_it/publications/ibc_paper_226_2003_revised_final.pdf.*

(Continued)

*Primary Examiner* — Joe Chacko
(74) *Attorney, Agent, or Firm* — Toler Law Group, PC (57) ABSTRACT

A system and method for sharing content is provided. A system incorporating teachings of the present disclosure may include, for example, a housing and a wide area network (WAN) connector extending from the housing. The system may also include a graphical user interface (GUI) engine located within the housing. In practice, the GUI engine may be operable to initiate an outputting of a first list navigable with a remote control and a second list navigable with the remote control. The remote control may be a Set Top Box (STB) remote control and the first list may be configured to facilitate remote control-based navigation. The first list may contain an identifier for at least one piece of selectable content, which may be, for example, photographs, videos, songs, etc. The second list may include an alias for at least one available share partner. In practice, a user of the system may want to give a share partner revocable access to some portion of selectable content.

10 Claims, 5 Drawing Sheets

(56) References Cited

U.S. PATENT DOCUMENTS

| | | | |
|---|---|---|---|
| 6,798,532 B1 | 9/2004 | Okino | |
| 6,975,832 B2 | 12/2005 | Adams et al. | |
| 6,983,373 B2 | 1/2006 | Furuya | |
| 6,985,875 B1 | 1/2006 | Wolf | |
| 7,430,753 B2* | 9/2008 | Gray et al. | 725/80 |
| 2002/0059621 A1* | 5/2002 | Thomas et al. | 725/87 |
| 2002/0151992 A1* | 10/2002 | Hoffberg et al. | 700/83 |
| 2002/0184638 A1* | 12/2002 | Agnihotri et al. | 725/89 |
| 2002/0194595 A1* | 12/2002 | Miller et al. | 725/36 |
| 2003/0220781 A1* | 11/2003 | Salmonsen et al. | 703/25 |
| 2003/0233551 A1* | 12/2003 | Kouznetsov et al. | 713/175 |
| 2004/0163130 A1* | 8/2004 | Gray et al. | 725/132 |
| 2004/0190853 A1* | 9/2004 | Dow et al. | 386/46 |
| 2005/0108430 A1 | 5/2005 | Howarth et al. | |
| 2005/0251411 A1* | 11/2005 | Ishii et al. | 705/1 |
| 2006/0031682 A1* | 2/2006 | Sakai et al. | 713/182 |
| 2007/0011250 A1* | 1/2007 | Kortum et al. | 709/206 |

OTHER PUBLICATIONS

PCT/US07/00898, International Search Report mailed Feb. 19, 2008.

PCT/US07/00898, Written Opinion mailed Feb. 19, 2008.

* cited by examiner

SYSTEM AND METHOD FOR SHARING CONTENT WITH A REMOTE DEVICE

FIELD OF THE DISCLOSURE

The present disclosure relates generally to sharing content and more particularly to a system and method for sharing content with a remote device.

BACKGROUND

A great deal of audio, video, and/or photographic content is captured and/or stored in personal computing devices. For example, it is not uncommon for a modern family to have a digital camera, to take pictures with that digital camera, and to store the taken pictures on the family computer.

While content is relatively easy to create and store, many consumers find the currently available techniques for managing and sharing the content to be unacceptable. Often, content must be stored, an electronic mail program must be launched, appropriate content must be attached to a new mail message, and then the electronic mail message must be sent. This process is often repeated frequently. Moreover, at the conclusion of this inefficient and timely process, the content is permanently given to the addressee of the message.

Accordingly, there is a need for a different system and method of sharing content with a remote device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Embodiments discussed below describe, in part, techniques for sharing content with one or more remote devices. Much of the following discussion focuses on Set-Top Box (STB) embodiments and the sharing of digital content such as digital images, digital audio, and digital video. Moreover, much of the discussion focuses on implementations in which a network-based service provider facilitates the sharing. While the teachings may be utilized in these embodiments, the following discussion is illustrative and is not intended to limit the scope of the invention.

As indicated above, a great deal of audio, video, and/or photographic content is captured and/or stored in personal computing devices. While the content may be relatively easy to create and store, many consumers may not like having to use a personal computer and an electronic mail package to share the stored content. Unfortunately, many content sharing programs are designed to execute on a personal computer and have interfaces that require a mouse and "double-click" inputting.

From a high level, systems incorporating teachings of the present disclosure may allow users to share content from non-personal computer (non-PC) environments. These same systems may operate without an email client and may be manipulated without a mouse—allowing user interface (UI) manipulations, for example, from devices such as STB remote controls. In particular embodiments, operation of such a system may allow users to share content without a separate sharing program like Microsoft Outlook™. Moreover, operation of such a system may be encapsulated within a STB such that a user may be able to view content, decide to share it with a friend, and effectuate the share at that point without using the family PC or launching a new application.

Depending upon design considerations, a system incorporating teachings of the present disclosure may include a housing and a wide area network (WAN) connector extending from the housing. The system may also include a graphical user interface (GUI) engine located within the housing. In practice, the GUI engine may be operable to initiate an outputting of a first list navigable with a remote control and a second list navigable with the remote control. The remote control may be a Set Top Box (STB) remote control and the first list may be configured to facilitate remote control-based navigation. The first list may contain an identifier for at least one piece of selectable content, which may be, for example, photographs, videos, songs, etc. The second list may include an alias for at least one available share partner. In practice, a user of the system may want to give a share partner revocable access to some portion of selectable content.

As mentioned above, FIG. 1 presents a block diagram of a home entertainment system 10 that incorporates teachings of the present disclosure. As depicted, system 10 includes an integrated tuning device 12, which may be a Set-Top Box (STB), a personal computer (PC), a wireless local area networking (WLAN) hub, or some other integrated electronic device. As depicted, device 12 includes a network interface adapter 14 providing at least a portion of a communication path interconnecting device 12 to a wide area communication network, which may include a cable network, a direct broadcast satellite (DBS) system, a telecommunication network, and/or some other network capable of communicating information to and potentially from device 12.

Figure 1:
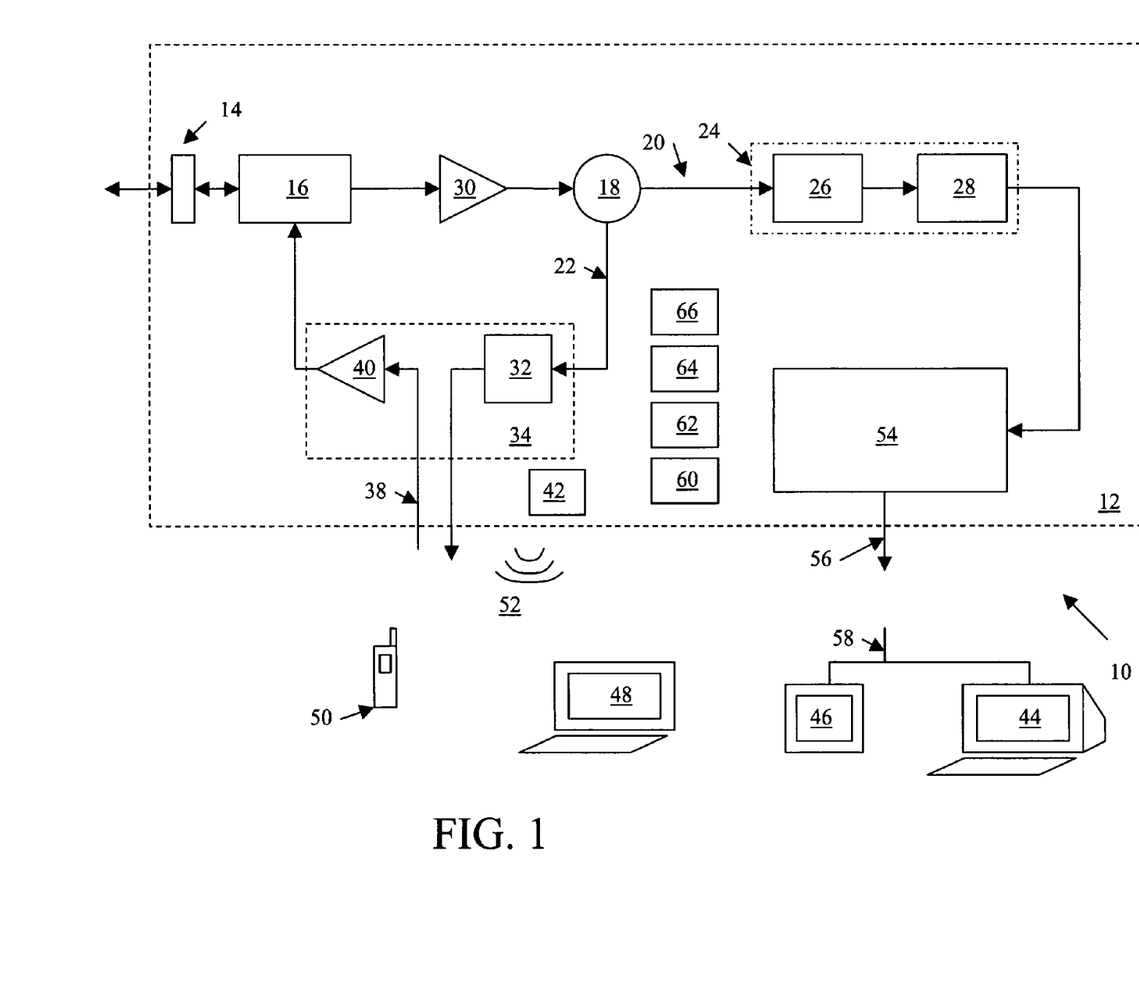
FIG. 1 is a block diagram of a home entertainment system that incorporates teachings of the present disclosure.

In operation, adapter 14 may receive a signal representing several different types of information including video information streams, telephony-related information, data transmissions, and/or other types of information. For example, a cable service provider may broadcast a signal to each of its customers that represents hundreds of video channels and several more broadcast audio channels. Satellite television providers, like DBS providers, may provide even more channels. A signal received by adapter 14 may include these types of signals in combination with other less universally distributed signals.

In some embodiments of device 12, adapter 14 may perform front-end subsystem functions like signal reception, demodulation, error correction, signal encoding, and/or other signal manipulations. Many of these subsystem functions may be provider specific. For example, a signal coming from a cable head end may require front end processing that is substantially different than the processing performed on a DBS signal.

Adapter 14 may output a processed signal to diplexer 16. As depicted, device 12 may be capable of performing several high-end functions. For example, in addition to performing some STB-like functions, device 12 may also effectively function as a multimedia desktop computer that runs a variety of advanced services such as videoconferencing, home networking, Internet Protocol telephony, Video on Demand (VoD), high-speed Internet Television, personal video recording, and/or others. Diplexer 16 may facilitate some of these services by distinguish between upstream and downstream communication flow. In some embodiments, different types of traffic may be carried in different frequency bands. For example, data traffic may be carried in one band while voice telephony traffic may be carried in another. Similarly, upstream traffic may be carried in a defined frequency range that is different than the defined frequency range of downstream traffic. As such, diplexer 16 may be able to separate traffic types by reference to the frequency of the signals.

Diplexer 16 may output a downstream multiplexed signal to a splitter 18, which may be passive in operation. In some embodiments, splitter 18 may passively split a signal into an intermediate signal 20 and a downstream data stream 22. Signal 20 may feed an output module 24. As shown, output module 24 may include a decoder 26 and a modulator 28. Because splitting a signal may degrade the noise figure (NF) of a system, a low noise, high linearity amplifier 30 may be added to device 12 upstream of splitter 18. In some embodiments, amplifier 30 may be low noise and high linearity so as not to compromise what is downstream in the signal chain.

As shown, splitter 18 may also pass a data stream 22 through tuner 32 to a modem 34, which may be integral to or separate from device 12. Modem 34 may be a cable modem supporting a DOCSIS standard, a dial-up modem, a wireless modem, a satellite modem, some other type of modem, and/or an xDSL modem. In some embodiments, tuner 32 may alter stream 22 and output a signal in a form or modulation schema acceptable to modem 34. On the upstream side, an outgoing signal 38 may pass through amplifier 40 and into diplexer 16 for delivery to a broader network, like the Public Internet.

In some embodiments, device 12 may include wireless local area network (WLAN) module 42. Module 42 may operate as a WLAN hub and my support communication via a 900 MHz communication signal similar to those employed by cordless telephones, an 802.11(x) communication protocol, a Bluetooth communication protocol, or some other WLAN communication technique. When operating as a WLAN hub, module 42 may effectively allow device 12 to act as a wireless home networking hub. As such, other electronic devices in the home, like desktop computer 44, television 46, laptop 48, and wireless telephone 50 may be able to enjoy shared content and/or Internet connectivity via device 12 and wireless link 52.

Device 12 may also include a premises network interface 54, which may output signal 56 with information streams representing, among other things, broadcast channel programs to premises network element 58. In some embodiments, network interface 54 may also support modem 34 and/or allow for two-way communication across premise network element 58. As depicted, device 12 also includes a local memory 60, which may store, among other things, a file having computer-readable instructions.

The computer-readable instructions may, for example, direct one or more processors or engines within device 12 to present a representation of at least a portion of selectable content on a display associated with device 12 such as a television screen. The representation may be presented in connection with a graphical user interface that is easily navigable with a remote control as opposed, for example, to a mouse or keyboard. The selectable content represented may take many forms. For example, selectable content may be locally and/or remotely stored information representing audio content, video content, informational content, photographic content, some other type of content, and/or combinations thereof. In some embodiments, the selectable content may be owned or controlled by a user of device 12. For example, if the content is of a photographic content type, the content may be pictures taken by the user and uploaded to a remote repository.

The computer-readable instructions may also direct other behavior. For example, the instructions may help device 12 to receive a content selection from the user and to present a listing of available share partners, which may represent remote electronic devices to which the user would like to give access to his or her content. The instructions may also help device 12 to receive a user selection of a share partner and to output a share signal indicating a willingness on the part of the user to share the selection of content with the share partner. Similarly, a user may at some point elect to terminate a share. As such, the instructions may also help device 12 to receive a remove share request indicating a desire to stop a sharing of the selection of content with the share partner and to output a share revocation signal indicating the desire to stop the sharing.

Memory 60 may also maintain a network address for one or more potential share partners. In one embodiment, the network address may be a share partner username, a telephone number, an STB serial number, an Internet Protocol (IP) address, a MAC address, an email address, some other identifier, and/or a combination thereof. In practice, a share partner may be, for example, an individual, a device, and/or a collection of individuals or devices, with whom the user of device 12 may want to share stored content. Share partners, network addresses, and/or "nicknames" or aliases may be linked and programmed into memory 60 and may, in some cases, be readily updateable.

In an embodiment where device 12 "knows" a network address for a share partner, sharing engine 62 may initiate communication of a message to a network-based service provider indicating that a user of device 12 desires to share some content with a specific share partner. The content to be shared may be stored, for example, in the network, locally at the premises of the device 12 user, and/or at some publicly or privately accessible Web address associated with a service provider network element, a content repository associated with an intranet, extranet and/or the Public Internet 48, and/or some other network-connected resource.

From the perspective of a share partner, the content share may begin in response to a retrieval command, which may be initiated in several ways. For example, a share partner may receive a message indicating that the user of device 12 would like to share certain content with the share partner. In response, the share partner may press a button on his or her STB remote control and/or interact with a graphical user interface (GUI) presented on a display and effectively let the user of device 12 and/or a service provider for that user "know" that the share partner is interested in accessing the to-be-shared content.

With such advanced features, device 12 may also include a Web interface engine 64. Web interface engine 64 may allow remote web-based administration of and/or communication with device 12. Device 12 may also include local administration features.

For example, graphical user interface (GUI) engine 66 may be capable of initiating presentation of a GUI on a television display communicatively coupled to premises network 58. The GUI may also be presented in connection with a Web browser and a Web browsing session of a user. In operation, an administrator and/or home user may be presented with an administration screen. The screen may allow for simplified configuration of the features associated with device 12. Additionally, the administration screen may allow a user to add and/or remove listed share partners and/or sharable content. In some cases, the various screens presented by GUI engine 66 may be navigable with a STB remote control. Moreover, the GUIs presented may be designed to help ensure that an STB remote control is a sufficient user input mechanism.

As mentioned above, FIG. 2 depicts a flow chart to illustrate a technique 210 for sharing content in accordance with teachings of the present disclosure. At step 212, a user may navigate to content or some representation of content. In practice, the content may be stored locally and/or remotely from the user. The content may be, for example, photographic content and may be broken out into individual photographs and/or grouped into "photo albums". Other types of content such as audio, video, and informational content may also be presented as either individual pieces of content and/or grouped pieces of content. At step 212, content may be selected for sharing and technique 210 may then move to step 214.

Figure 2:
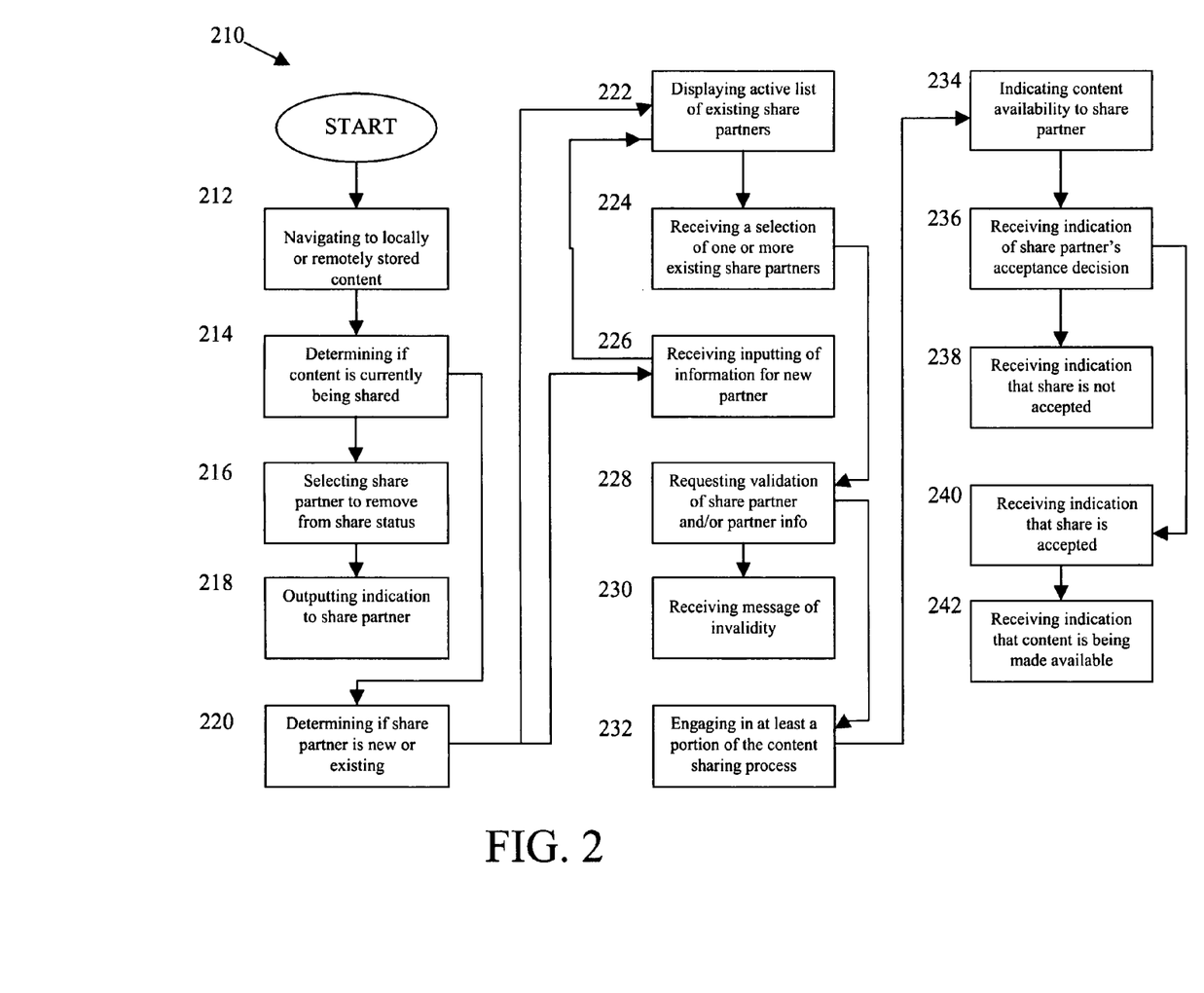
FIG. 2 depicts a flow chart to illustrate a technique for sharing content in accordance with teachings of the present disclosure.

At step 214, the current sharing status of selected content may be determined. If content is currently being shared with a particular share partner and the user wants to terminate the existing share, technique 210 may progress to step 216. At step 216, a share partner may be selected for share revocation and a share revocation signal may be output at step 218. One technique for revoking a share is discussed more fully in connection with FIG. 3.

In practice, a user may elect to stop sharing content with a share partner for several reasons. The user may believe the shared content has grown stale. The user could also be operating within some type of digital rights protection schema. For example, a service and/or content provider may allow a user to simultaneously share content with some limited number of share partners. In some cases, the number may be one. In those cases, the user may even be required to forego access to some content during the time in which the user is allowing a share partner to have access. The number of simultaneous shares could be fixed and/or adjusted depending on circumstances. In some embodiments, a device like device 12 may indicate to a user an allowed number of simultaneous shares and a current number of simultaneous shares. If the user sees at step 214 that he or she has reached the maximum number of shares, the user may elect to remove one share partner in order to free up room for adding a new share partner.

At step 214, the user may elect to add another share partner to some selected content. Technique 210 may then progress to step 220 to determine if the other share partner is a new share partner or an existing share partner. An existing share partner may be one with whom a user has shared content in the past and/or for whom the user has already established an account or contact file.

If the user does not need to add a new share partner, technique 210 may progress to step 222 at which point an active list of existing share partners may be displayed. At step 224, one or more share partners may be selected, and technique 210 may progress to step 228.

If the user does want to add a new share partner, technique 210 may progress to step 226, and the user may input information about the new share partner such as a name, an alias, a network address for some electronic device of the new share partner, etc. In practice, technique 210 may then cycle back from step 226 to step 222.

At step 228, share partners selected for content sharing may be validated to determine, for example, if a share partner device is connected to the network, if a share partner is an active customer, if a share partner account is fully paid, etc. If a share partner is not or cannot be validated, technique 210 may progress to step 230 for that invalid share partner and an invalid message may be returned to the user seeking to share content with the invalid share partner.

If one or more share partners are validated at step 228, technique 210 may progress to step 232. At step 232, a user may engage in some portion of the sharing process. The level of user involvement may depend on various considerations. For example, if the to be shared content is stored local to the user, the content may need to be uploaded. If the content is already located in a network-based repository, the user may simple need to confirm his or her desire to share content.

At step 234, a message may be sent to potential share partners indicating that shared content is available. The message my, for example, be sent from the user directly or from a network-based service provider. However sent, a response may be received at step 236. If the potential share partner declines the share opportunity, technique 210 may progress to step 238. If the potential share partner accepts the share opportunity, technique 210 may progress to step 240, and the user who sought to establish the share may be notified at step 242 that sharing is active.

Figure 3:
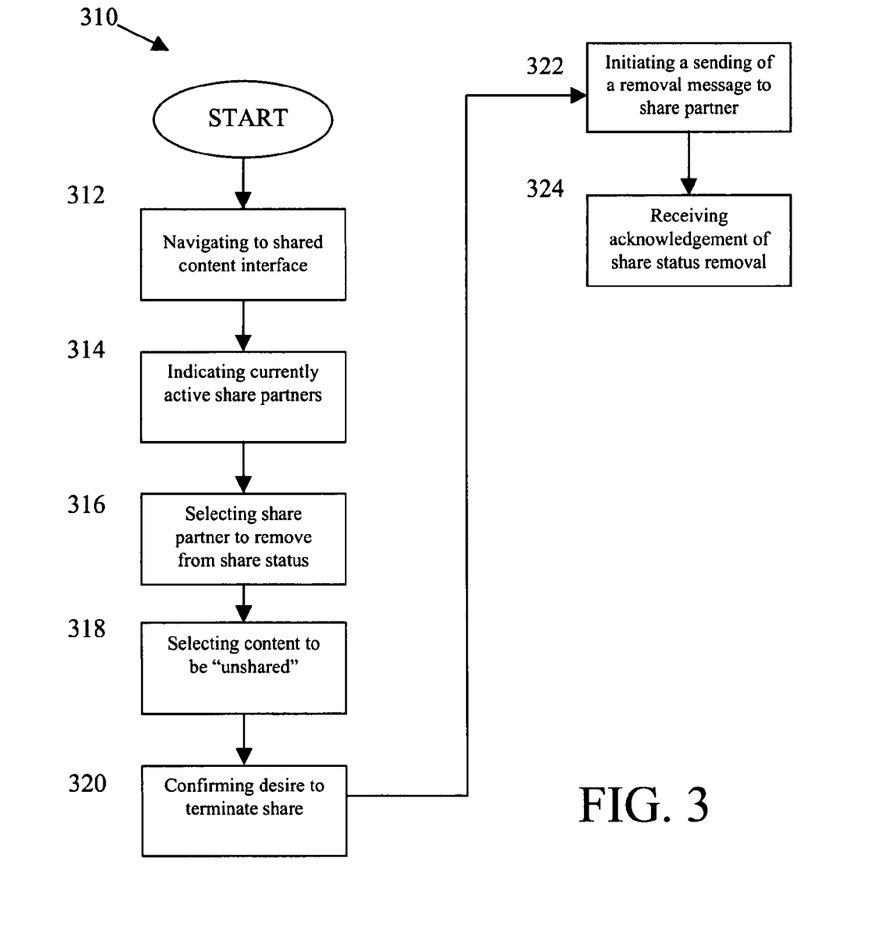
FIG. 3 depicts a flow chart to illustrate a technique for removing a content share in accordance with teachings of the present disclosure.

FIG. 3 depicts a flow chart to illustrate a technique for removing a content share in accordance with teachings of the present disclosure. At step 312, a user may see a shared content interface. The interface may list current content shares and the share partners included in each of the current content shares may also be displayed in connection with step 314. At step 316, a currently active share partner may be selected for share status revocation. At step 318, the content that will no longer be shared may be selected. And, at step 320, a user may confirm his or her desire to remove a particular share partner from a particular content share.

At step 322, a removal message may be sent to the share partner informing the share partner that the content share is being disabled. At step 324, one or more of the content "owner" and the removed share partner may be notified that the share is officially revoked and disabled.

As mentioned above, FIG. 4 is a general diagram of a system 446 for sharing content with remote devices in accordance with teachings of the present disclosure. In operation, end users may have respective STBs communicatively coupled to a service provider network 448 and an information network 450, like the Public Internet, an Intranet, an Extranet, some other communication network, and/or some combination thereof. As shown, system 446 includes several premises 452, 454, and 456, each having its own STB 458, 460, and 462, respectively.

Figure 4:
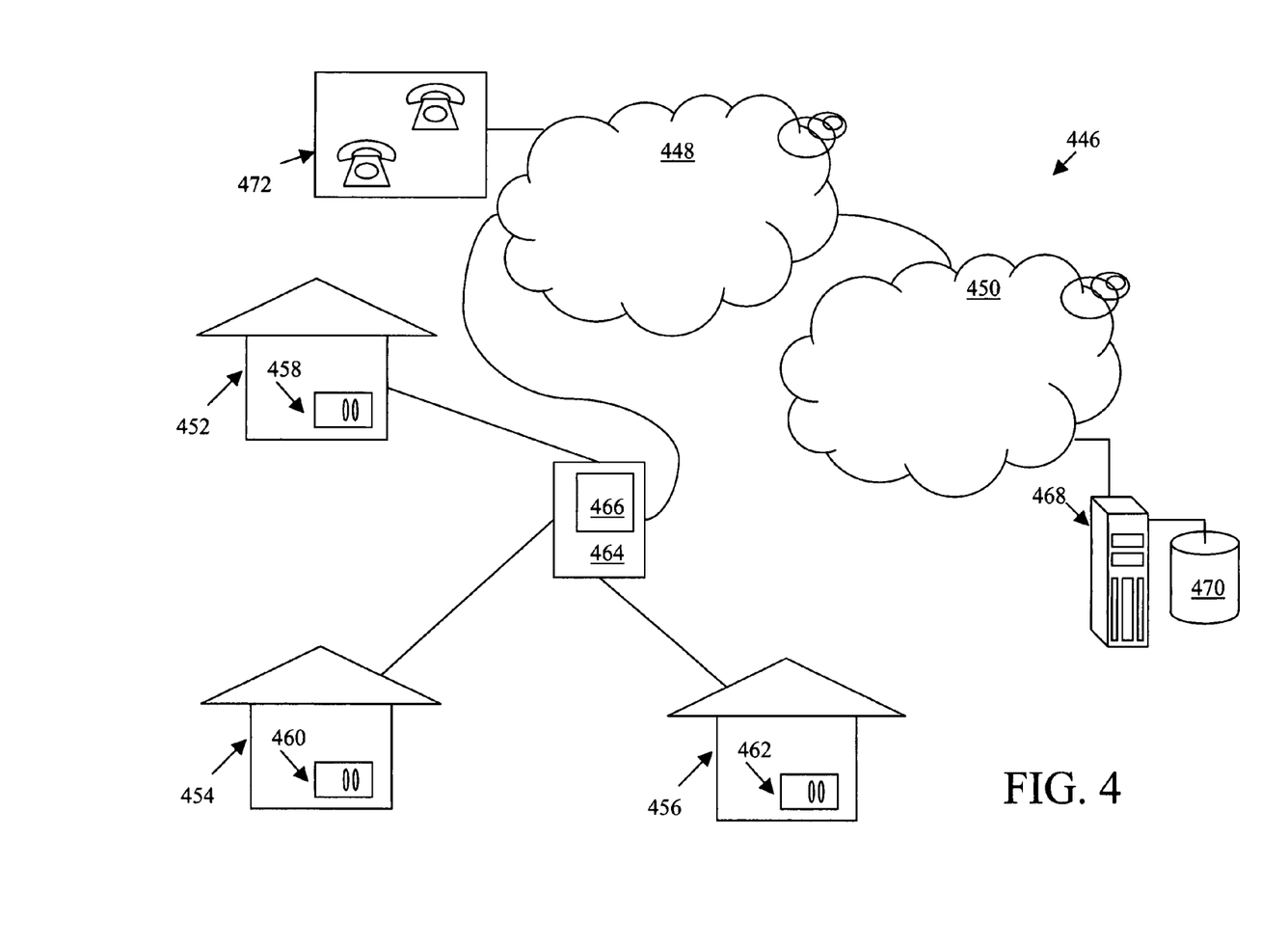
FIG. 4 is a general diagram of a system for sharing content with remote devices in accordance with teachings of the present disclosure.

In practice, a user at premises 452 may have a broadband via STB 458. The backhaul may be capable of communicatively coupling to service provider network 448. Network 448 may include, for example, a Public Switched Telephone Network (PSTN), a cable network, some xDSL infrastructure, a wireless network, and/or some other networking components capable of facilitating data communication. Whatever its make up, network 448 may be capable of communicating information. The communication could occur, for example, across dedicated circuits, as IP packets, and/or across an air interface.

As depicted, STB 458 may communicate with and/or through a facility 464 of network 448. Facility 464 may be, for example, a remote terminal (RT) site, a central office, a cable head end, an optical interface, or some other provider facility. As such, facility 464 may include network nodes like aggregation point 466, which may be a DSLAM or a CMTS for example. In operation, a user may connect to aggregation point 466 and, as a result, have access to an information services server like content sharing server 468, which may have an associated repository 470 maintaining content and share partner information for the user living at premises 452.

In practice, server 468 and associated repository 470 may maintain a collection of available content for each of the users residing at premises 452, 454, and 456. In operation, server 468 may receive a share signal indicating that the user at premises 452 desires to share a portion of his user available content with the user at premises 456. Server 468 may then make that portion of the user's available content accessible to the user at premises 456. Moreover, server 468 may eventually receive a share revocation signal indicating that the premises 452 user now wants to revoke sharing privileges from the user at premises 456. In response, server 468 may make the once shared portion of user available content inaccessible to the user at premises 456.

While a service provider operating server 468 may want the process to operate automatically and without excessive human intervention, the service provider may elect to have a call center 472 to assist users in configuring STBs, managing share initiations, managing share revocations, satisfying digital rights protection policies, uploading content to repository 470, removing content from repository 470, adding share partners, removing share partners, etc.

As mentioned above, FIG. 5 shows one embodiment of a system 574 for facilitating the sharing of content in accordance with teachings of the present disclosure. As shown, system 574 may include a computer 576 having a display device 578. As shown, a user may have begun a browsing session and launched a web browser application like Internet Explorer™, which may cause the presentation of a browser bar 580 and a viewing pane 582 on display 578.

Figure 5:
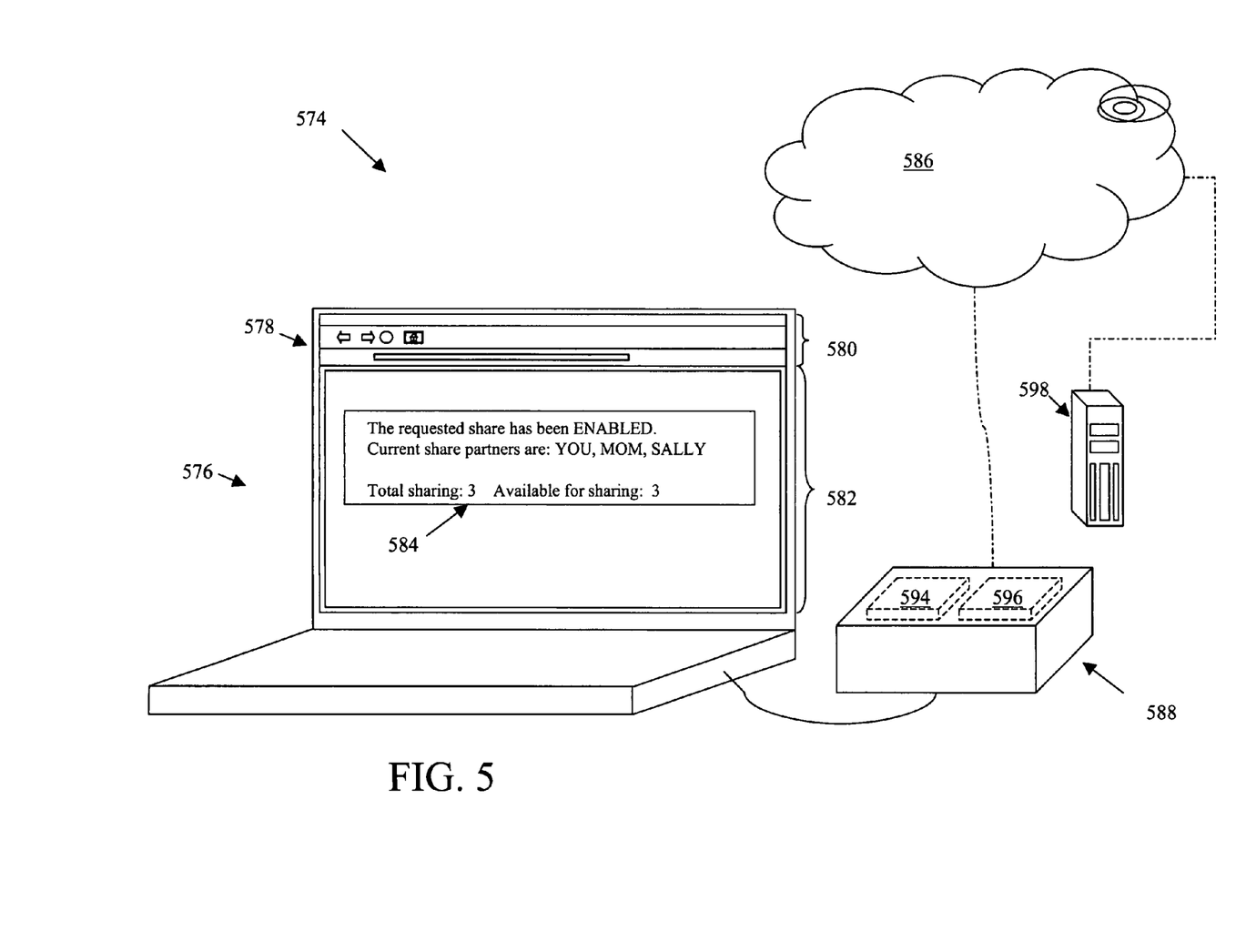
FIG. 5 is a general diagram of a system and interface for facilitating the sharing of content in accordance with teachings of the present disclosure.

As shown, viewing pane 582 includes a GUI element 584 informing the user that a requested share has been established and that the combination of the user and the two active share partners maxes out the allowable number of users for the content being shared. In the depicted embodiment, computer 576 relies on connection device 588 to facilitate connection to network 586. In practice, device 588 may be a STB, a broadband modem, and/or some other WAN connected device.

As shown, device 588 includes a housing component that at least partially defines an enclosure housing a broadband modem module 594 and a processor 596. In operation, processor 596 may execute computer readable instructions directing processor 596 to execute a PPPoE client, to manage IP address conditions, to communicate status information to computer 576, to manage intercommunication of information with computer 576, to perform one or more steps of technique 210, and/or other functions.

As mentioned above, communication between device 588 and a node of network 586 may take several forms. Communication may occur across dedicated circuits, in a packetized manner, across virtual connections, in a special data frequency band, across a wireline connection including copper, optical fiber, coaxial fiber, an air interface, and/or a combination thereof. Similarly, communication between device 588 and computer 576 may take several forms. There may be a physical link of copper, coax, fiber, etc. There may also be an air interface that utilizes Radio Frequency (RF) communication. As such, a device like computer 576 and device 588 may be capable of Radio Frequency communication with one another and with other nodes via a Wireless LAN using a short-range or local wireless technology like 802.11, Wi-Fi, Bluetooth, and/or some other technique. However communication occurs, device 588 may be capable of communicating with a network-based server like server 598 to facilitate content shares with remote electronic devices.

It should be understood that the mechanisms, computers, devices, engines, servers, and/or platforms, described herein, may take several different forms and may be stand alone and/or incorporated into several different pieces of equipment, like STBs, laptop computers, desktop computers, telephones, mainframes, PSTN switches, Ethernet switches, routers, gateways, hardware, firmware, software, work stations, other options having some level of computing capability, and/or a combination thereof. For example, various engines could be independent applications, could be independent servers, could be executing on different platforms, and/or could be executing on a single platform.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for facilitating a sharing of content, the system comprising:
   a housing;
   a wide area network connector coupled to the housing;
   a graphical user interface engine located within the housing, wherein the graphical user interface engine outputs a first list navigable with a remote control and a second list navigable with the remote control, wherein the first list comprises a selectable identifier set for a portion of content controlled by a first user, wherein a selectable identifier in the selectable identifier set corresponds to particular content, wherein the second list comprises a selectable alias set, and wherein a selectable alias in the selectable alias set corresponds to a device of a particular user; and
   a sharing engine to:
      send a message via the wide area network connector to a device associated with a second user whose alias is selected in the second list in response to receipt by the graphical user interface engine of user input to send an offer to the second user, wherein the message indicates a desire of the first user to enable the second user to access first content corresponding to a selected identifier in the first list, wherein a number of other users that are able to be granted access to the first content is limited to a first number;
      receive an acceptance response to the message; and
      send, in response to the acceptance response, a notification to a display device associated with the first user that the second user is granted access to the first content, wherein the notification includes a first indicator of a current number of the other users granted access to the first content and a second indicator of the first number.

2. The system of claim 1, further comprising a set top box device that comprises the housing, the wide area network connector, the graphical user interface engine, and the sharing engine.

3. The system of claim 2, wherein the display device comprises a television communicatively coupled to the set top box device and operable to display the first list and the second list.

4. The system of claim 1, wherein the sharing engine sends the message to the device via a network-based service provider that stores the first content.

5. The system of claim 1, wherein the sharing engine is configured to:
   receive a revocation command for the first content, wherein the revocation command includes an identifier associated with the second user; and
   send a revocation message for the first content to the device.

6. The system of claim 1, wherein the first content is stored remote from the graphical user interface engine.

7. The system of claim 1, wherein the graphical user interface engine presents an update screen to allow the first user to add an alias of an additional user to the second list.

8. The system of claim 1, further comprising an upload engine to allow the first user to add an additional selectable identifier to the first list.

9. The system of claim 1, wherein content type of the content is from a group consisting of a video content type, an audio content type, a photographic content type, and an informational content type.

10. The system of claim 1, wherein an alias of the second list corresponds to a third user associated with a remote set top box device.

* * * * *